No. 617,653. Patented Jan. 10, 1899.
T. C. GRAHAM & J. H. & W. K. KELLOGG.
PROCESS OF EXTRACTING OIL FROM NUTS.
(Application filed Sept. 9, 1897.)
(No Model.)
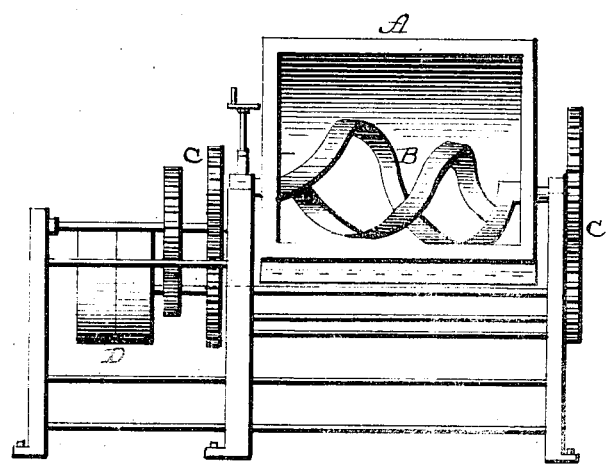
Witnesses
Rosann Smith
W. H. Reid.
Inventors
T. C. Graham,
J. H. Kellogg,
per W. K. Kellogg,
Hensey, Bond, Robinson,
Attorney

UNITED STATES PATENT OFFICE.

THORNTON C. GRAHAM, JOHN H. KELLOGG, AND WILLIE K. KELLOGG, OF BATTLE CREEK, MICHIGAN.

PROCESS OF EXTRACTING OIL FROM NUTS.

SPECIFICATION forming part of Letters Patent No. 617,653, dated January 10, 1899.

Application filed September 9, 1897. Serial No. 651,067. (No specimens.)

*To all whom it may concern:*

Be it known that we, THORNTON C. GRAHAM, JOHN H. KELLOGG, and WILLIE K. KELLOGG, citizens of the United States, residing in Battle Creek, in the county of Calhoun and State of Michigan, have invented certain new and useful Improvements in Methods of Extracting Oil from Nuts and other Similar Products, of which the following is a specification.

Our invention relates to improvements in methods of extracting oil from nuts and other similar products; and it consists in slightly roasting the nuts, blanching them or removing the skins which surround the kernels, grinding the kernels to a paste, and then adding water slowly and in certain proportions while the paste is being stirred, as will be more fully described hereinafter.

The object of our invention is to extract oil from nuts of all kinds without the use of either heat or pressure or of any special apparatus for the treatment of the nuts after they are ground.

The accompanying drawing represents a mechanism by means of which our process is carried into execution, and which mill is of ordinary construction.

*a* represents the receptacle, *b* the stirrer placed therein, and *c c'* the operating mechanism, which is driven by a belt through pulleys *d*.

In treatment of the nuts of whatever kind we first take the kernels and slightly roast them at a temperature of from 300° to 350°. Then the skins which surround the kernels are removed and the kernels ground to a paste. The reduction to a paste of the kernels is effected by means of pressure, such as may be employed by rollers or any other suitable mechanism, and then the paste is put into a mixer, such as is shown in the drawing, and hot water is then added to form a paste. While this paste is being stirred or rolled by an apparatus similar to that used by confectioners and bakers, water in just the right proportion is slowly added and stirred into the paste. Either cold or hot water may be used, the result being the same in either case; but the process is somewhat shortened by using hot water, because it enters into the mass more readily. The term "blanching" is employed synonymously with removing the skins. Water is not added during the grinding operation, but during the stirring which takes place after the paste has been introduced into the mixer. As the water is added little by little the oil begins to exude from the thick mass, rising to the top.

By practical experience we have found that thirty-two pounds of oil may be removed from one hundred pounds of peanuts by the addition of thirty-two pounds of water, a pound of oil being obtained for each pound of water used. The amount of oil varies somewhat, however, according to the temperature of the mixture, the maximum amount of oil being obtained at a temperature of about 130°, while three or four per cent. less is obtained at a temperature of 40°.

It is not possible to remove all of the oil by our method. The best results we have obtained is nearly thirty-three per cent. from peanuts, which contain about forty-five per cent. of oil. We obtain about three-fourths of all the oil contained in the nuts. The residue left in the nuts is not wasted, as it is used in manufacturing various valuable food products.

This oil is not obtained by any process of pressure, nor by dissolving the nuts in water and separating the oil so that it floats on the top, nor by the use of heat or heat and pressure in the usual manner. If more than a certain definite amount of water is added, the oil disappears, being converted into an emulsion. The water as it enters into the combination with the crushed nuts displaces the oil, which is thrown out and rises in liquid form upon the semisolid mass beneath.

By our process the oil is more quickly and cheaply removed than by any process heretofore known and is obtained in a pefectly clear and pure state, so that it requires no further process of refining or filtering more than simply straining to remove extraneous particles. The oil is simply dipped off the top of the pasty mass, is allowed to settle, and then decanted in a clear and pure state. Oil thus prepared keeps well at all temperatures and is a remarkably limpid product.

Having thus described our invention, we claim—

The process herein described of obtaining oil from nuts and other similar substances, consisting in slightly roasting the nuts, removing their skins, then grinding them, then rolling them so as to form a thick pasty mass, and then adding water to the mass, in a certain regulated proportion and stirring it substantially as set forth.

THORNTON C. GRAHAM.
JOHN H. KELLOGG.
WILL. K. KELLOGG.

Witnesses:
NEWTON K. SHELDEN,
P. S. KELLOGG,
A. W. SPAULDING.